(No Model.)
J. STAMM.
CUTTER HEAD.
No. 264,906. Patented Sept. 26, 1882.
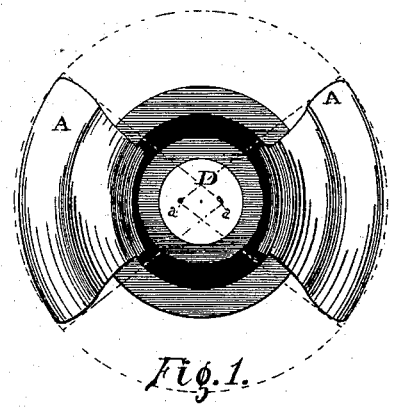
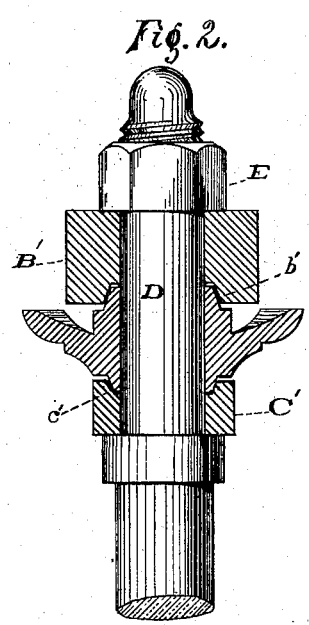
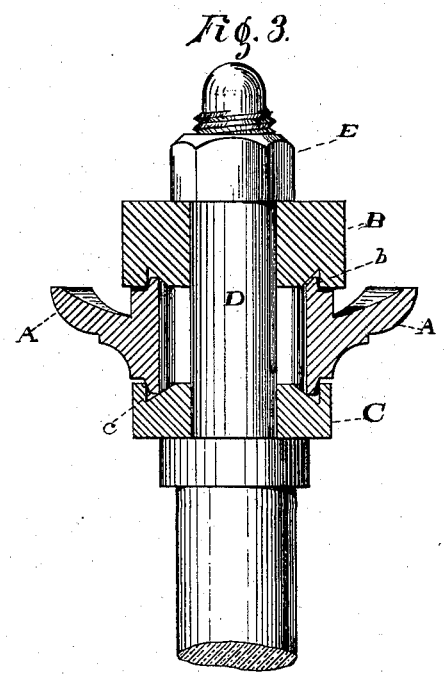
Attest
Horatio V. Croll
Alfred B. Benedict
Inventor
Julius Stamm
By Geo. J. Murray
Atty

UNITED STATES PATENT OFFICE.

JULIUS STAMM, OF AURORA, INDIANA.

CUTTER-HEAD.

SPECIFICATION forming part of Letters Patent No. 264,906, dated September 26, 1882.

Application filed December 19, 1881. (No model.)

*To all whom it may concern:*

Be it known that I, JULIUS STAMM, of the city of Aurora, county of Dearborn, State of Indiana, have invented certain new and useful Improvements in Molding Cutter-Heads, of which the following is a specification.

The object of this invention is a turned cutter-head the cutting-edges of which will describe a greater circle when rotated than the body of the bit, so that it will cut without rubbing when revolved in either direction, and without changing the position of the bit upon the spindle. Its object is also to provide a secure means of fastening the bit-pieces between the collars. The first of these objects is attained by making the grooves in the collars of a smaller circle than the tenons upon the bit-pieces which are to enter them, thus making the radii of the bit-pieces greater than the radius of the path of travel when mounted for use. The second object is accomplished by making the grooves inclined in vertical section and the tenons to enter them correspondingly beveled, or with parallel sides, so that the tenons will wedge themselves tightly when the tightening-nut is screwed down.

In the accompanying drawings, Figure 1 is a plan view of my improved bit and the upper collar. Fig. 2 is an axial section of one form of my invention; Fig. 3, a similar view of my preferred form of bit and fastening-collars.

Similar reference-letters indicate identical parts in the various views.

The cutters A A, Figs. 1 and 3, are cut from a piece of steel previously turned to the proper shape and radially divided into four parts and sharpened in the usual way. The upper collar, B, and lower collar, C, are perforated to snugly fit the reduced upper end of the spindle D. In the faces of the collars B C are turned annular grooves *b c*. The outer walls of these grooves are perpendicular, or nearly so, while the inner walls incline and form an angle with the outer walls at the bottom. The annular tenons upon the upper and lower ends of the cutters A are made with parallel sides, so that when the nut E is screwed down upon the spindle the outer walls of the tenons will be jammed against the outer walls of the grooves and held firmly against turning. The grooves are less in diameter than the circle of which the tenons are a part, so that when the bit-pieces are in position upon the spindle the center of the grooves is the axis of rotation, while the center or axis of each bit-piece A is upon the opposite side of the axis of rotation, at *a*. Cutter-pieces so mounted will always have a clearance or rake back of the cutting-edges until worn out, whichever way the spindle is rotated. The arc of the tenons being of a greater radius than the arc of the groove-wall against which it rests, the outer corners of the tenons are pressed firmly against the outer wall of the groove when the nut is tightened down. Thus slipping of the cutters in use is entirely prevented.

In the form represented in Fig. 2 the bit-pieces are turned up and formed the same as in Figs. 1 and 3, except that the outer walls of the tenons are inclined toward the ends, and the collars B' C' have, instead of grooves, annular rabbets, the shoulders of which are also inclined to correspond with the bevel on the tenons, so that when the nut is tightened down the bit-pieces are jammed firmly against the spindle. This form allows a smaller collar below the bit-pieces, and is employed when small curves are to be molded.

Instead of the form of tenon and groove shown to secure my bit-pieces in position, any well-known form may be adopted and the first object of my invention attained, provided the bit-pieces are so placed that their central radii will pass through and extend beyond the axis of rotation.

I claim—

1. The combination, substantially as hereinbefore set forth, of the spindle, collars, and tightening-nut of a frizzing-machine with segmental bit-pieces, as A, secured between the collars, with the opposite cutting-edges of each piece in the same circular path, and the central radius of each piece passing through and extending beyond the spindle-center, so that the bit will cut either right or left and have a clearance back of the cutting-edges without changing the bit-pieces in their collars.

2. The combination, in a frizzing cutter-head, of the pieces A, having annular tenons, as shown, with grooved collars to receive said tenons, the tenons being arcs of a greater circle than the groove.

3. The combination, substantially as hereinbefore set forth, of spindle D and nut E with the bit-pieces A, having annular tenons with parallel sides, and collars B C, having beveled annular grooves $b\ c$, said grooves formed on the arc of a circle of less diameter than that of which the tenons are formed.

JULIUS STAMM.

Witnesses:
L. M. FOULK,
P. W. WILLIAMS.